Figure 1:
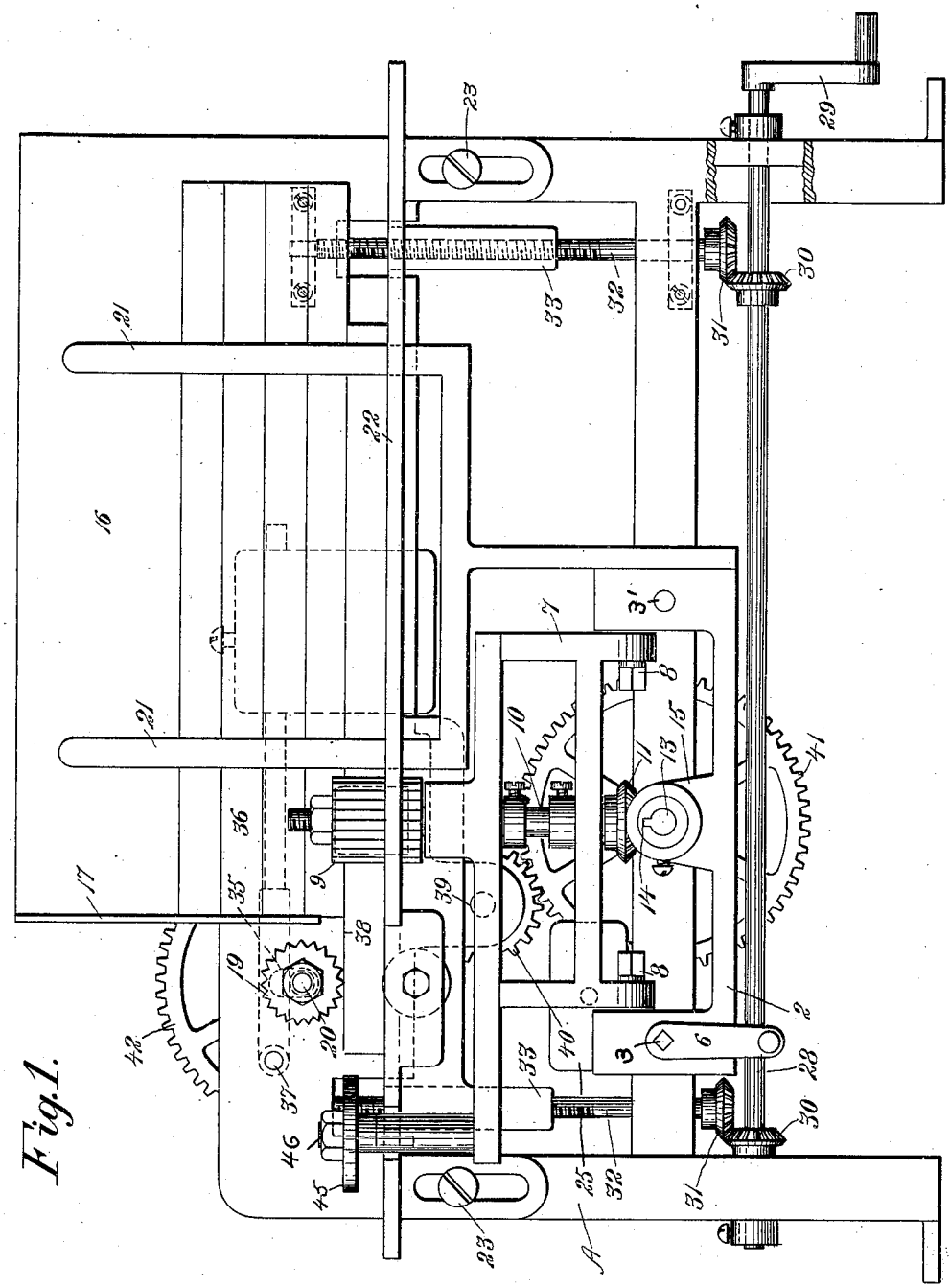

No. 889,025. PATENTED MAY 26, 1908.
J. C. LUDWIG, Jr.
FEEDER FOR WOODWORKING MACHINES.
APPLICATION FILED JULY 31, 1907.

2 SHEETS—SHEET 1.

WITNESSES:
Alex Currie
J. H. Dowse

INVENTOR
John C. Ludwig Jr.
BY
Geo. H. Strong
ATTORNEY

No. 889,025. PATENTED MAY 26, 1908.
J. C. LUDWIG, Jr.
FEEDER FOR WOODWORKING MACHINES.
APPLICATION FILED JULY 31, 1907.
2 SHEETS—SHEET 2.
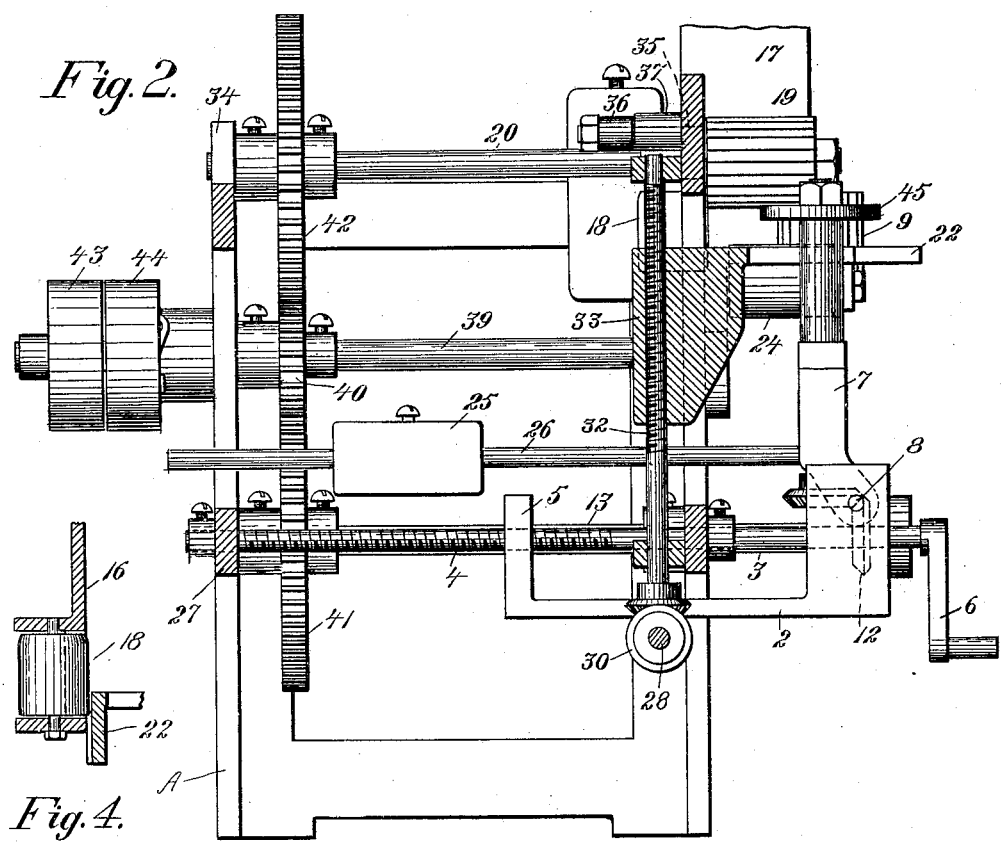
Fig. 2.
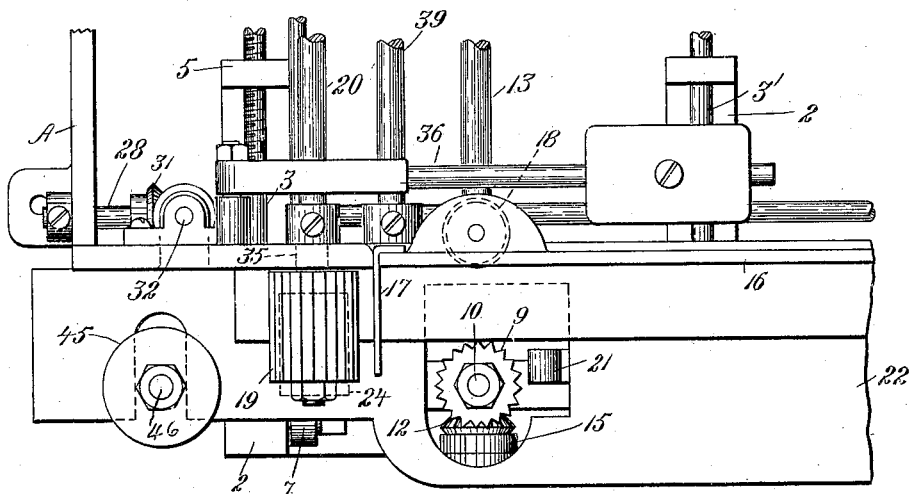
Fig. 4.
Fig. 3.
WITNESSES:
Alex Currie
INVENTOR
John C. Ludwig Jr.
BY
Geo. H. Strong
ATTORNEY

UNITED STATES PATENT OFFICE.

JOHN C. LUDWIG, JR., OF SAN FRANCISCO, CALIFORNIA.

FEEDER FOR WOODWORKING-MACHINES.

No. 889,025.      Specification of Letters Patent.      Patented May 26, 1908.

Application filed July 31, 1907. Serial No. 386,322.

*To all whom it may concern:*

Be it known that I, JOHN C. LUDWIG, Jr., citizen of United States, residing in the city and county of San Francisco and State of California, have invented new and useful Improvements in Feeders for Woodworking-Machines, of which the following is a specification.

My invention relates to feeders for woodworking machines. Its object is to provide a machine for automatically feeding sticks or pieces of timber to a cutter-head, saw, or the like; which machine may be adjusted to feed stock of any reasonable thickness or width;
which will automatically adjust itself to any unevennesses in the stock, and which will handle stock of any length, or successive pieces of varying lengths.

The invention consists of the parts and the construction and combination of parts as hereinafter more fully described and claimed, having reference to the accompanying drawings, in which—

Figure 1 is a front elevation of the machine. Fig. 2 is a sectional end view thereof. Fig. 3 is a plan view of the delivery end of the same. Fig. 4 is a detail view of the vertical anti-friction roller.

A represents a fixed frame of any suitable construction.

2 is a carriage suitably mounted to move in a horizontal plane sidewise of the frame A. As here shown, the carriage 2 is supported to slide in and out on the guide rods 3—3'.
One of these guide rods, as 3, is screw-threaded, as at 4, to engage a correspondingly threaded nut portion 5 on the carriage 2. A crank or hand-wheel 6 is attached to this threaded rod or shaft 3, so that by turning the shaft 3 the carriage 2 is moved in or out.

7 is a frame mounted on the horizontal pivots 8 and carrying the feed-roller 9, which turns on a vertical axis. The shaft 10 carrying the feed-roller 9 is provided with a beveled gear 11 meshing a corresponding gear 12 on a shaft 13. The shaft 13 is journaled in the fixed support A, and the beveled gear 13 is slidable on a feather 14 on the shaft 13, the gear being suitably journaled in a lug 15 on the carriage 2. The points of contact of the teeth of gears 11—12 are in the line of the pivots 8 of the oscillating frame 7, so that the frame 7 may have a limited oscillating movement without carrying the beveled gears 11—12 out of mesh.

The side of the frame A adjacent to the feed-roller 9 is provided with a fixed vertical surface 16, against which the work is pressed by the feed-roller 9. A plate 17, arranged slightly in advance of the feed-roller, and at right angles to the surface 16, forms, in conjunction with the surface 16, a hopper into which the stock to be acted upon is delivered. An idle roller 18 is journaled in an opening in the frame A and opposite feed-roller 9, and forms an anti-friction surface between which and the roller 9 the work will pass on into engagement with a second feed-roller 19 mounted on the horizontal shaft 20. The carriage 2 is provided with guide members 21, which move towards and from the surface 16 in unison with the carriage, to increase or diminish the width of the hopper space.

A table or work support 22 is vertically adjustable on the frame A (and guided by the bolts 23,) towards and from the horizontal feed-roller 19. The guide members 21 and the first-mentioned or vertical feed-roller 9 pass up through transverse slots in the table, and the movement in and out of the feed-roller 9 and the guides 21 is independent of the table. The latter is provided with an idle roller 24 opposed to the horizontal feed-roller 19, to form an anti-frictional support to the underneath side of the timber.

The frame 7 is oscillated normally in a direction to carry the feed-roller 9 towards the co-acting surface 16 by suitable means, as the adjustable counterweight 25 on the arm 26. The arm 26 is fixed to the frame 7 and a suitable stop is provided, as, for example, the cross-bar 27 of the frame, to limit the downward movement of the arm when there is no work in the machine, so that the roller 9 will not swing in too far.

The vertical adjustment of the table 22 is effected by any suitable means. As here shown, a line shaft 28 having a suitable crank 29 is journaled in the frame A and carries the beveled gears 30. These gears mesh corresponding gears 31 on the vertical worm shafts 32. The latter engage the threaded nut portions 33 on the table, so that when the crank 29 is turned in one direction both ends of the table will be raised simultaneously to bring the table nearer to the horizontal feed-roller 19, and when the crank is turned in the opposite direction the table will be correspondingly lowered to increase the distance between the table and said feed-roller; thus adapting the machine to the feeding of lumber of different thickness. Correspondingly, a turning of crank 6 on the screw-shaft 3 will increase or decrease the distance between the vertical surface 16 and roller 9 to adapt the machine to lumber of different widths.

The counterweighting of the oscillating frame 7 allows the feed-roller 9 to be yieldingly supported against the work, so that any ordinary differences in width of stock, or of successive pieces of lumber, will not affect the practical operation of the machine. The horizontal feed-roller 19 is also yieldingly supported, so that it may raise or lower automatically in case a thickness of timber is encountered slightly greater or less than was provided for by the initial adjustment of the machine.

The shaft 20 is journaled in the bearing 34 in the frame A, and the other end is movable up and down in a slot 35 in the opposite side of the frame. A counterweighted rod 36, fulcrumed at 37, normally bears down on the shaft 20 to cause the horizontal feed-roller 19 to press with suitable force on the top of the work, which is represented at 38.

Motion is simultaneously imparted to both feed-rollers 9—19 from a central drive-shaft 39, which carries the gear 40 meshing corresponding gears 41—42 on the respective shafts 13—20. The shaft 39 carries a loose pulley 43, and also a friction pulley 44, which latter corresponds to the usual fixed pulley on a drive-shaft. The purpose of having a friction pulley, or otherwise arranging for slippage, is to prevent the clogging of the wood-working machine to which this feeder is adapted to feed the stuff, or otherwise to prevent breakage or disarrangement of the parts.

In operation, the stock to be acted upon is fed into the hopper space between the surface 16, plate 17, and guides 21; the carriage 2 being manipulated in or out so that the guides will be just a proper distance from the surface 16, as to support the lumber without binding it against the surface 16. The counterweight 25 will always act on the hinged frame 2, except at the moment when the work is being delivered from this machine to the cutter-head or saw, in such fashion that the roller 9 will press with sufficient force against the wood, and cause the same to be fed forward when the drive-shaft 39 is revolved. The table 22 is raised or lowered so that it will be brought at the proper distance from the horizontal feed-roller 19, and enable the stock to be grasped by the latter as it is fed forward by the initial feed-roller 9. Having effected the adjustments of the carriage 2 and table 22, the drive-shaft 39 is set in motion, whereupon the lowermost piece of timber is seized upon by the feed-roller 9 and carried forward beneath the lower end of the plate 17 into engagement with the horizontal second feed-roller 19. Both rollers then act on the stock momentarily, until the front end of the stock engages a plain roller 45 which is carried on a vertical arbor 46 on the oscillating frame 7. This roller 45 engages the same side of the stock that the initial feed-roller 9 does, but it is so positioned that at all times it is nearer to the opposed guide surface 16 than the initial feed-roller is. The result is that as soon as the stock encounters the roller 45 it rocks the frame 7 and carries the initial feed-roller out of engagement with the stock. From that time on, then, until the timber leaves the roller 45 the feed-roller 9 is inoperative, although it continues to turn, and the feeding of the stock forward is done by the horizontal feed-roller 19 until the timber is delivered into the machine to which the present device is attached. Thereupon the machine to which this device feeds takes hold of the timber and draws it forward from further engagement with the rollers 19 or 45. As soon as the spreading action of the timber on roller 45 ceases, the oscillating frame swings inward again so that the second piece of timber piled up in the hopper, which has dropped meanwhile into the position just vacated by the preceding timber, is seized upon by the initial roller, and the operation is repeated. In this machine the control of the initial feed-roller is effected by the idle presser-roller 45, and independent of the secondary feed-roller 19. Both feed-rollers 9 and 19 are yieldingly and independently supported. The vertical anti-friction roller 18, it is to be observed, has its upper end beveled, as shown in Fig. 4, so that the stock will not catch on the roller as it drops on to the table.

Having thus described my invention, what I claim and desire to secure by Letters Patent is—

1. A lumber-feeding machine having in combination a vertically disposed feed-roller, a horizontal feed-roller beyond the first-named roller, a supporting surface opposed to each feed-roller, and between which surface and the feed-rollers, the work to be fed is passed, means for operating the feed-rollers, a support for the vertical feed-roller said support being vertically disposed and arranged substantially parallel with one side of the machine, and being rockable transversely of the direction of feed of the work, and means carried by the rockable support and located beyond the horizontal feed-roller and in the range of action of the work for temporarily disengaging the vertical feed-roller from said work.

2. A lumber-feeding machine having in combination vertical and horizontal feed-rollers and a supporting surface opposing each roller, means for operating the rollers, an adjustable carriage having a vertically disposed frame the lower portion of which is pivotally mounted in the carriage, whereby the frame is rockable in a plane transversely of the direction of feed of the lumber, said vertical roller being mounted on said frame, and a member on said frame, beyond both feed-rollers and disposed in the range of travel of the lumber and adapted to disengage the vertical feed-roller from the lumber when the forward end of said lumber contacts with said member.

3. In a lumber-feeding machine, the combination of two feed-rollers arranged substantially at right angles to each other, a supporting surface opposed to each feed-roller and between which supporting surface and said feed-rollers the work to be fed is passed, means for operating said feed-rollers, independent means operated on by the work for temporarily disengaging one of said feed-rollers, a vertically disposed support having its lower portion hingedly secured whereby the upper portion is rockable transversely of the direction of feed of the work, one of said feed-rollers mounted on said support, and an adjustable carriage to which said rockable support is hinged.

4. A lumber-feeding machine having in combination a primary feeding-mechanism, a secondary feeding-mechanism, a transversely-rockable, vertically disposed frame hingedly secured at its lower portion and having its upper portion serving as a support for the primary feeding-mechanism, and a member carried by said frame and disposed in the range of travel of the lumber, for automatically disengaging the primary feeding-mechanism from feeding contact with the lumber.

5. In a machine of the character described, the combination of a horizontally adjustable carriage, a frame hinged to said carriage, a vertical shaft journaled in said frame, a feed-roller on said shaft, a horizontal feed-roller supported independent of the first, work supports opposed to each of said feed-rollers, and means for operating the feed-rollers.

6. In a machine of the character described, the combination of a horizontally adjustable carriage, a frame hinged to said carriage, a vertical shaft journaled in said frame, a feed-roller on said shaft, a horizontal feed-roller supported independent of the first, work supports opposed to each of said feed-rollers, means for operating the feed-rollers, and means independent of the feed-rollers and acted upon by the work to throw the vertical feed-roller out of action subsequent to the taking hold of the work by the horizontal feed-roller.

7. In a machine of the character described, the combination of a horizontally adjustable carriage, a frame hinged to said carriage, a vertical shaft journaled in said frame, a feed-roller on said shaft, a horizontal feed-roller supported independent of the first, work supports opposed to each of said feed-rollers, means for operating the feed-rollers, and means independent of the feed-rollers and acted upon by the work to throw the vertical feed-roller out of action subsequent to the taking hold of the work by the horizontal feed-roller, said last-named means comprising a tripping device carried by the oscillating frame.

8. In a machine of the character described, the combination of a horizontally adjustable carriage, a frame hinged to said carriage, a vertical shaft journaled in said frame, a feed-roller on said shaft, a horizontal feed-roller supported independent of the first, work supports opposed to each of said feed-rollers, means for operating the feed-rollers, and means independent of the feed-rollers and acted upon by the work to throw the vertical feed-roller out of action subsequent to the taking hold of the work by the horizontal feed-roller, said last-named means comprising a roller mounted on the oscillating frame.

9. In an apparatus of the character described, the combination of a fixed frame, a transversely adjustable carriage, an oscillating frame mounted on the carriage, a vertical feed-roller on the carriage, a drive-shaft journaled in the fixed frame, driving connections between said shaft and said vertical feed-roller, a horizontal feed-roller journaled in the fixed frame, connections between the drive-shaft and said horizontal roller, a vertically adjustable table, and a work support opposed to the vertical feed-roller.

10. In an apparatus of the character described, the combination of a fixed frame, a transversely adjustable carriage, an oscillating frame mounted on the carriage, a vertical feed-roller on the carriage, a drive-shaft journaled in the fixed frame, driving connections between said shaft and said vertical feed-roller, a horizontal feed-roller journaled in the fixed frame, connections between the drive-shaft and said horizontal roller, a vertically adjustable table, a work support opposed to the vertical feed-roller, and means for causing said feed-rollers to press yieldingly against the work.

11. In an apparatus of the character described, the combination of a fixed frame, a transversely adjustable carriage, a transversely oscillating frame mounted on the carriage, a vertical feed-roller on the frame and movable towards and from the work, a drive-shaft journaled in the fixed frame, driving connections between said shaft and said vertical feed-roller, a horizontal feed-roller journaled in the fixed frame, connections between the drive-shaft and said horizontal roller, a vertically adjustable table, a work support opposed to the vertical feed-roller, and a tripping device on the oscillating frame engageable by the work to throw the vertical feed-roller out of action after the horizontal feed-roller has taken hold of the work.

In testimony whereof I have hereunto set my hand in presence of two subscribing witnesses.

JOHN C. LUDWIG, Jr.

Witnesses:
 FRANK L. OWEN,
 CHAS. E. TOWNSEND.